US010360051B2

(12) United States Patent
Authement et al.

(10) Patent No.: US 10,360,051 B2
(45) Date of Patent: Jul. 23, 2019

(54) EMULATED DEVICE FIRMWARE TESTABLE BY NATIVE OPERATING SYSTEM TOOLS

(71) Applicant: International Business Machines Corporation, Armonk, NY (US)

(72) Inventors: Shawn P. Authement, Round Rock, TX (US); Swetha Sampath, Cypress, TX (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 14/578,528

(22) Filed: Dec. 22, 2014

(65) Prior Publication Data
US 2016/0179557 A1 Jun. 23, 2016

(51) Int. Cl.
G06F 9/445 (2018.01)
G06F 3/06 (2006.01)
G06F 9/455 (2018.01)
G06F 16/188 (2019.01)
G06F 9/4401 (2018.01)

(52) U.S. Cl.
CPC ............ G06F 9/455 (2013.01); G06F 3/0664 (2013.01); G06F 16/196 (2019.01); G06F 9/4411 (2013.01); G06F 2009/45579 (2013.01)

(58) Field of Classification Search
None
See application file for complete search history.

(56) References Cited

U.S. PATENT DOCUMENTS

| 4,885,679 | A | * | 12/1989 | Webster, Jr. | ......... G06F 13/105 703/25 |
| 5,918,048 | A | * | 6/1999 | Mealey | ................ G06F 9/4406 703/26 |
| 7,031,902 | B1 | | 4/2006 | Catiller | |
| 7,493,627 | B2 | * | 2/2009 | Chambers, Jr. | ....... G06F 9/4411 717/174 |
| 8,671,270 | B2 | * | 3/2014 | Oigawa | ............... G06F 9/45533 703/26 |

(Continued)

FOREIGN PATENT DOCUMENTS

| GB | 2237422 A | 5/1991 |
| GB | 2237422 B | 5/1991 |

(Continued)

OTHER PUBLICATIONS

El Maghraoui et al., "Modeling and Simulating Flash Based Solid-State Disks for Operating Systems", In Proceedings of the first joint WOSP/SIPEW International Conference on Performance Engineering, pp. 15-26. ACM, 2010.

(Continued)

Primary Examiner — Kibrom K Gebresilassie
(74) Attorney, Agent, or Firm — David B. Woycechowsky

(57) ABSTRACT

Firmware is run in an emulated environment such that firmware is not embedded in its designed-for target device. Target device emulation software communicatively connects the firmware to the operating system in a manner so that communications sent from and received by the operating system are identical to communications that would be sent from and received by the operating system if the firmware were actually embedded in the target device instead of running in the emulated environment.

20 Claims, 10 Drawing Sheets

(56) References Cited

U.S. PATENT DOCUMENTS

| | | | |
|---|---|---|---|
| 9,146,837 B2* | 9/2015 | Jamison | G06F 11/3664 |
| 9,189,225 B2* | 11/2015 | Boone | G06F 8/65 |
| 2004/0030877 A1* | 2/2004 | Frid | G06F 8/654 |
| | | | 713/1 |
| 2004/0162973 A1* | 8/2004 | Rothman | G06F 8/60 |
| | | | 713/1 |
| 2004/0215440 A1 | 10/2004 | Crowell | |
| 2005/0108514 A1* | 5/2005 | Rothman | G06F 9/455 |
| | | | 713/2 |
| 2005/0188368 A1* | 8/2005 | Kinney | G06F 8/71 |
| | | | 717/174 |
| 2005/0276092 A1* | 12/2005 | Hansen | G06F 3/0626 |
| | | | 365/149 |
| 2006/0041883 A1* | 2/2006 | Chambers, Jr. | G06F 9/4411 |
| | | | 717/174 |
| 2006/0069534 A1* | 3/2006 | Kinney | G06F 9/45533 |
| | | | 703/1 |
| 2006/0184349 A1* | 8/2006 | Goud | G06F 9/45537 |
| | | | 703/24 |
| 2006/0212691 A1* | 9/2006 | Wood | G06F 9/441 |
| | | | 713/1 |
| 2006/0294355 A1* | 12/2006 | Zimmer | G06F 21/572 |
| | | | 713/2 |
| 2007/0033419 A1* | 2/2007 | Kocher | G06F 21/10 |
| | | | 713/193 |
| 2007/0083355 A1 | 4/2007 | Collins et al. | |
| 2007/0094422 A1* | 4/2007 | Huang | G06F 3/0619 |
| | | | 710/14 |
| 2007/0162626 A1* | 7/2007 | Iyer | G06F 3/0607 |
| | | | 710/8 |
| 2007/0299650 A1* | 12/2007 | Tamayo | G06F 11/261 |
| | | | 703/27 |
| 2008/0288238 A1* | 11/2008 | Heller, Jr. | G06F 9/45504 |
| | | | 703/28 |
| 2009/0217111 A1 | 8/2009 | Ito | |
| 2012/0084071 A1* | 4/2012 | Cyr | G06F 11/0712 |
| | | | 703/25 |
| 2013/0007182 A1* | 1/2013 | Macchiano, Sr. | H04L 29/08945 |
| | | | 709/213 |
| 2013/0047031 A1* | 2/2013 | Tabone | G06F 11/1417 |
| | | | 714/15 |
| 2013/0054943 A1* | 2/2013 | Bhatia | G06F 1/3206 |
| | | | 713/1 |
| 2013/0103886 A1* | 4/2013 | Bhatia | G06F 13/12 |
| | | | 711/103 |
| 2013/0151831 A1* | 6/2013 | Bealkowski | G06F 9/4401 |
| | | | 713/2 |
| 2013/0212671 A1* | 8/2013 | Wang | G06F 21/70 |
| | | | 726/16 |
| 2013/0218551 A1* | 8/2013 | Sakthikumar | G06F 21/572 |
| | | | 703/24 |
| 2014/0005974 A1* | 1/2014 | Vyas | G06F 11/263 |
| | | | 702/123 |
| 2014/0337004 A1* | 11/2014 | Maity | G06F 9/4401 |
| | | | 703/25 |
| 2015/0261696 A1* | 9/2015 | Christian | G06F 13/105 |
| | | | 703/25 |
| 2015/0261697 A1* | 9/2015 | Christian | G06F 13/107 |
| | | | 703/25 |
| 2018/0225230 A1* | 8/2018 | Litichever | G06F 21/56 |

FOREIGN PATENT DOCUMENTS

| | | |
|---|---|---|
| KR | 1020090106138 A | 10/2009 |
| WO | 9319419 A1 | 9/1993 |
| WO | 9419746 A1 | 9/1994 |

OTHER PUBLICATIONS

Lee et al., "Design and Implementation of a Virtual Platform of Solid-State Disks." IEEE Embedded Systems Letters, vol. 4, No. 4, Dec. 2012, pp. 90-93, doi:10.1109/LES.2012.2213795.

* cited by examiner

452

```
(X) (-) (□)  sas console root> cpu.regs
PORPLLSR:      x00c54008
DEVDISR:       xf10c04f1
HID0:          x80004000
HID1:          x00003000
PVR:           x80210021
SVR:           x80390121
PIR:           x00000000
MSR:           x00029200

Processor: MPC8547E rev 2.1 (CPU core: e500v2 rev 2.1)
CPU: 0 MHz  DDR: 333 MHz  Plat: 333 MHz  TB: 41MHz root>
root>
root> scsi.debug on
Command Debugging is:  ON
Response Debugging is: ON
root> <info> SCSI port  0000000000000000000000000000000000 has logged in to port A.
[0x294c000] L:0000 attr:0  c:A cdb:12 00 00 00 24 00 00 00 00 00 00 00 00 00 00 00
[0x294c000] st:0 skey:0 asc_ascq:0000
[0x294c000] L:0000 attr:0  c:A cdb:12 00 00 00 60 00 00 00 00 00 00 00 00 00 00 00
[0x294c000] st:0 skey:0 asc_ascq:0000
[0x294c140] L:0000 attr:0  c:A cdb:12 01 00 00 fc 00 00 00 00 00 00 00 00 00 00 00
[0x294c140] st:0 skey:0 asc_ascq:0000
[0x294c000] L:0000 attr:0  c:A cdb:12 01 80 00 fc 00 00 00 00 00 00 00 00 00 00 00
[0x294c000] st:0 skey:0 asc_ascq:0000
[0x294c000] L:0000 attr:0  c:A cdb:88 00 00 00 00 00 00 00 00 00 00 00 00 20 00 00
[0x294c000] st:2 skey:6 asc_ascq:2900
[0x294c000] L:0000 attr:0  c:A cdb:88 00 00 00 00 00 00 00 00 00 00 00 00 20 00 00
[0x294c000] st:0 skey:0 asc_ascq:0000 root> scsi.stats
SCSI cmd types:
[0x12]:          4  [0x88]:          2
Queue Types received:
Simple:          1
Head of Q:       4
Ordered:         0
ACA:             0
Untagged:        0
Task Management Types received:
Terminate Task:          0
Clear ACA:               0
Target Reset:            0
Logical Unit Reset:      0
Query Unit Attention:    0
Clear Task Set:          0
Abort Task Set:          0
Query Task Set:          0
SCSI response status sent:
                Good [00]:           5
                Check Condition [02]:     1
                                Unit Attention [6]:     1
SCSI Inquiry command Types:
Standard:        0
Command Data:    0
root> ▮
```

```
shawn.authement@vsauthem:~$ ls -R /dev/sas/
/dev/sas/:
[blk] [sg]

/dev/sas/blk:
block
shawn.authement@vsauthem:~$ _
```

```
shawn.authement@vsauthem:~$
shawn.authement@vsauthem: sudo sg_inq /dev/sas/sg
standard INQUIRY:
   PQual=0  Device_type=0  RMB=0  version=0x05  [SPC - 3]
   [AERC=0]  [TrmTsk=0]  NormACA=1  HiSUP=1  Resp_data_format=2
   SCCS=0  ACC=0  TPGS=0  3PC=0  Protect=0  BQue=0
   EncServ=0  MultiP=1  (VS=0)  [MChngr=0]  [ACKREQQ=0]  Addr16=0
   [RelAdr=0]  WBus16=0  Sync=0  Linked=0  [TranDis=0]     CmdQue=1
   [SPI: Clocking=0x0  QAS=0  IUS=0]
      length=96 (0x60)   Peripheral device type:  disk
  Vendor identification: IBM
  Product identification: Flashcard
  Product revision level: 0000
shawn.authement@vsauthem:~$
shawn.authement@vsauthem:~$  sudo dd if=/dev/sas/blk/block of=/dev/null bs=512 count=1
1+ 0 records in
1+ 0 records out
512 bytes (512 B) copied,    0.010746 s, 47.6 kB/s
shawn.authement@vsauthem:~$
```

```
shawn.authement@vsauthem:~$ sudo fdisk /dev/sas/blk/block
Device contains neither a valid DOS partition table, nor Sun, SGI or OSF disklabel
Building a new DOS disklabel with disk identifier 0xe3e51486.
Changes will remain in memory only, until you decide to write them.
After that, of course, the previous content won't be recoverable.

Warning: invalid flag 0x0000 of partition table 4 will be corrected by w(rite)

Command (m for help): o
Building a new DOS disklabel with disk identifier 0x6bbda3a5.
Changes will remain in memory only, until you decide to write them.
After that, of course, the previous content won't be recoverable.

Warning: invalid flag 0x0000 of partition table 4 will be corrected by w(rite)

Command (m for help): n
Partition type:
   p   primary (0 primary, 0 extended, 4 free)
   e   extended
Select (default p): p
Partition number (1- 4, default 1):
Using default value 1
First sector (2048-65535, default 2048):
Using default value 2048
Last sector, +sectors or +size{K,M,G}  (2048 - 65535, default 65535):
Using default value 65535

Command (m for help): w
The partition table has been altered!

Syncing disks.
shawn.authement@vsauthem:~$ ▮
```

FIG. 4E

EMULATED DEVICE FIRMWARE TESTABLE BY NATIVE OPERATING SYSTEM TOOLS

BACKGROUND OF THE INVENTION

The present invention relates generally to the field of emulated firmware, and more particularly to the testing of emulated firmware.

In the field of computing and electronics, firmware can be described as the "control program" that is used to control electronic or computing devices (that is, "hardware"), in devices where the device's own control program is embedded in the hardware. Firmware is usually stored in non-volatile memory, such as flash memory or ROM (read only memory), and can be described as being semi-permanent, that is, it remains intact unless updated by an outside firmware update program.

In emulation generally, one piece of hardware and/or software imitates, or simulates another piece of hardware and/or software. Firmware emulation is also known. For example, it is useful to use emulation to run the firmware of a flash SSD (solid-state drive) inside of an emulated environment, which allows a greater flexibility of running specific scenarios such as preconditioning wear or error injection. Current methods of emulating a device, or firmware that runs on a device, utilize methods of emulation which run the emulated firmware in a "sandbox" (closed environment). In other words, in an emulated environment, the firmware runs, even though its target device is not present because software emulates all interactions that the firmware would normally have with the target device in which the firmware is designed to be embedded. For purposes of this document, "firmware" shall still be referred to as "firmware" even when it is running in an emulated environment.

Filesystem in Userspace (FUSE) is an operating system mechanism for Unix-like computer operating systems that lets non-privileged users create their own file systems without editing kernel code by running file system code in user space while the FUSE module provides only a kind of "bridge" to the actual interfaces of the kernel computational resources. A commonly used FUSE implementation, is implemented as a loadable kernel module. FUSE is useful for writing virtual file systems. Unlike traditional file systems that essentially save data to and retrieve data from disk, virtual filesystems do not actually store data themselves. Rather, they act as a view or translation of an existing file system or storage device. In principle, any resource available to a FUSE implementation can be exported as a file system.

CUSE (character devices in userspace) is a kernel module for Unix systems that allows character devices, such as USB devices, keyboards, mice, or other devices with serial data transmission from user-space, to create applications. The CUSE module is based on FUSE.

A RAW (sometimes also called "raw") device is a special kind of block device file that allows accessing a storage device such as a hard disk drive directly, bypassing the operating system's caches and buffers (although hardware caches may still be used). Applications like a database management system can use raw devices directly, enabling the database management system to manage how data is cached, rather than deferring this task to the operating system.

SUMMARY

According to an aspect of the present invention, a computer-implemented method includes the following steps (not necessarily in the following order): (i) running, on a first processor(s) set, an operating system; (ii) emulating, on a second processor(s) set, an emulated environment controlled by target device emulation software; (iii) running, on the second processor(s) set, firmware, designed for a target device, in the emulated environment; and (iv) communicatively connecting, by the target device emulation software, the firmware to the operating system in a manner so that communications sent from and received by the operating system are identical to communications that would be sent from and received by the operating system if the firmware were actually embedded in the target device instead of running in the emulated environment.

According to a further aspect of the present invention, a computer program product runs firmware in an emulated environment. The computer program product includes a computer readable storage medium having program instructions embodied therewith, wherein the computer readable storage medium is not a transitory signal per se. The program instructions executable by a first processor(s) set located in a first computer system cause the first computer system to perform a method including the following steps (not necessarily in the following order): (i) emulating, on the first processor(s) set, an emulated environment controlled by target device emulation software; (ii) running, on the first processor(s) set, the firmware in the emulated environment; and (iii) communicatively connecting the firmware to an operating system, running on a second processor(s) set, in a manner so that communications sent from and received by the operating system are identical to communications that would be sent from and received by the operating system if the firmware were actually embedded in the target device instead of running in the emulated environment.

According to a further aspect of the present invention, a computer system includes a processor, and a computer readable storage medium. The processor is configured to execute program instructions stored on the computer readable storage medium. The computer readable storage medium includes: (i) target device emulation instructions executable by the processor to provide an emulated environment for running firmware designed for a target device in an emulated environment; and (ii) firmware instructions to control a target device when embedded in a target device. The target device emulation instructions include instructions executable by the processor, when the firmware is running in the emulated environment, to communicatively connect the firmware to an operating system in a manner so that communications sent from and received by the operating system are identical to communications that would be sent from and received by the operating system if the firmware were actually embedded in the target device instead of running in the emulated environment.

BRIEF DESCRIPTION OF THE DRAWINGS

FIG. 4B is a screenshot view showing machine readable code used and/or generated by the second embodiment system;

FIG. 4C is another screenshot view showing machine readable code used and/or generated by the second embodiment system;

FIG. 4D is another screenshot view showing machine readable code used and/or generated by the second embodiment system;

FIG. 4E is another screenshot view showing machine readable code used and/or generated by the second embodiment system;

DETAILED DESCRIPTION

Figure 1:
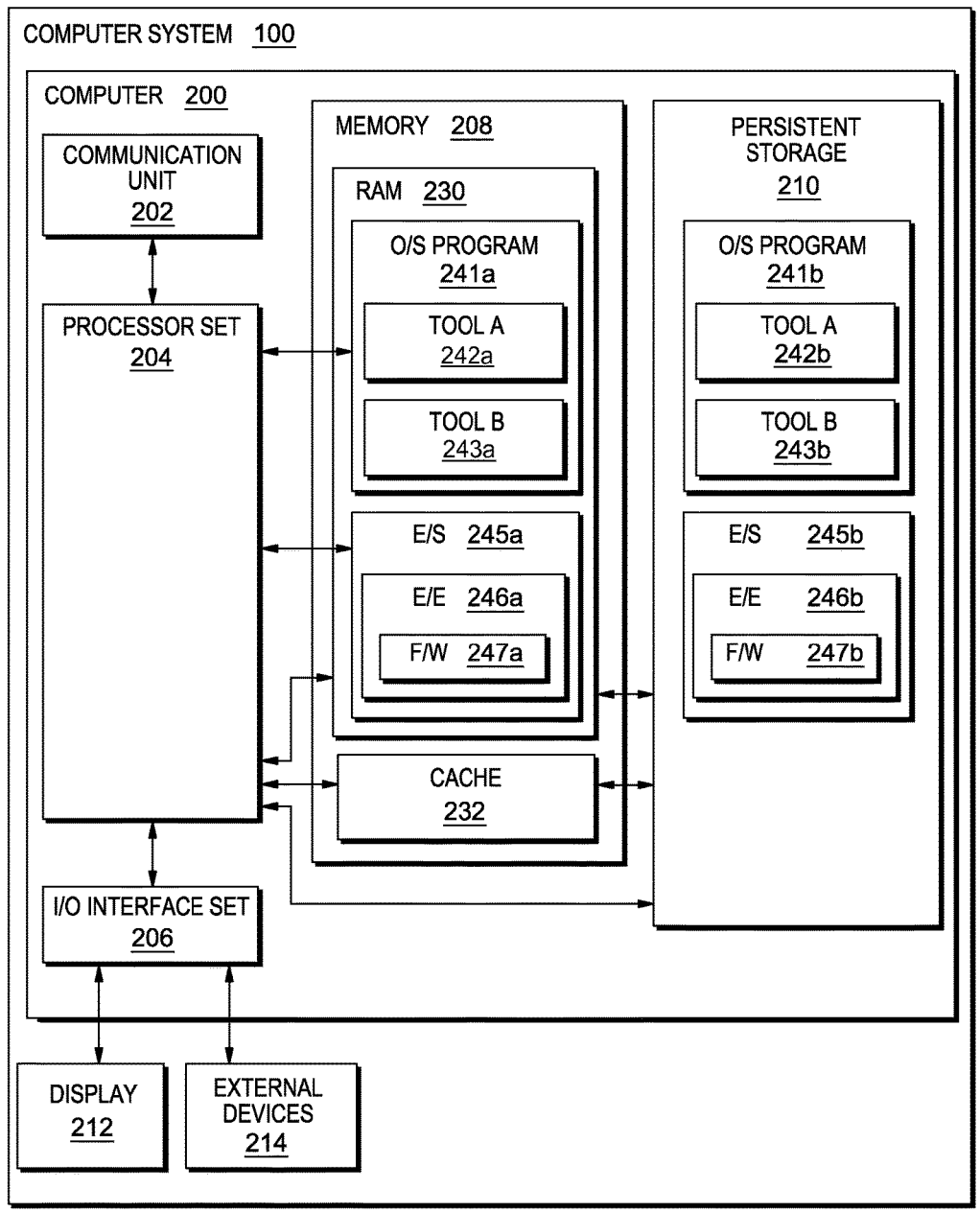
FIG. 1 is a schematic view of a first embodiment of a system according to the present invention.

Some embodiments of the present invention emulate peripheral firmware, such as flash solid state drive, using native operating system tools to test the firmware, such that from an operating system (OS) perspective the peripheral firmware appears as a real physical device. As used herein, the term "native OS tools" means tools which are typically shipped with, or available for the operating system. In some embodiments of the present invention, the user does not have to create his/her own testing tools which "understand" that the device is being emulated. Instead, in these embodiments, the user can simply use existing programs that operate as if they were communicating to a physical plugged-in device of a device type that the existing tools were designed to communicate with. The embodiment(s) of the present invention discussed in detail below use a POSIX-compliant operating system. However, other embodiments of the present invention may be designed for, and applied to, other operating systems (now known or to be developed in the future).

This Detailed Description section is divided into the following sub-sections: (i) The Hardware and Software Environment; (ii) Example Embodiment; (iii) Further Comments and/or Embodiments; and (iv) Definitions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of computer system 100, including: computer 200; communication unit 202; processor set 204; input/output (I/O) interface set 206; memory device 208; persistent storage device 210; display device 212; external device set 214; random access memory (RAM) devices 230; and cache memory device 232. Some computer programs, shown in FIG. 1 and operating in memory 208 and persistent storage 210 will be identified and discussed in the following sub-section of this Detailed Description section.

Computer 200 is, in many respects, representative of the various computer sub-system(s) in the present invention. Accordingly, several portions of computer 200 will now be discussed in the following paragraphs.

Computer 200 may be a laptop computer, tablet computer, netbook computer, personal computer (PC), a desktop computer, a personal digital assistant (PDA), a smart phone, or any programmable electronic device capable of communicating with the client sub-systems. Computer 200 is capable of communicating with other computer sub-systems, for example, a local area network (LAN), a wide area network (WAN) such as the Internet, or a combination of the two, and can include wired, wireless, or fiber optic connections.

Computer 200 is shown as a block diagram with many double arrows. These double arrows (no separate reference numerals) represent a communications fabric, which provides communications between various components of computer 200. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for computer 200; and/or (ii) devices external to computer 200 may be able to provide memory for computer 200.

Programs are stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to computer 200. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Figure 2:
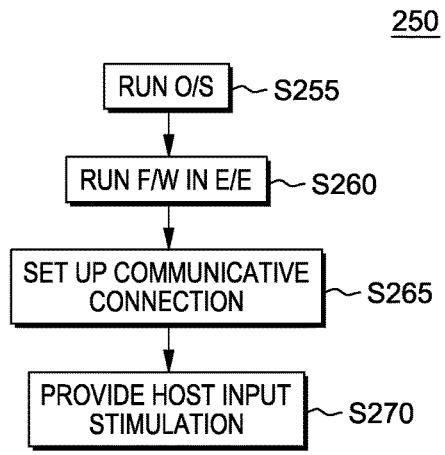
FIG. 2 is a flowchart view showing a first embodiment of a method according to the present invention.
Figure 3:
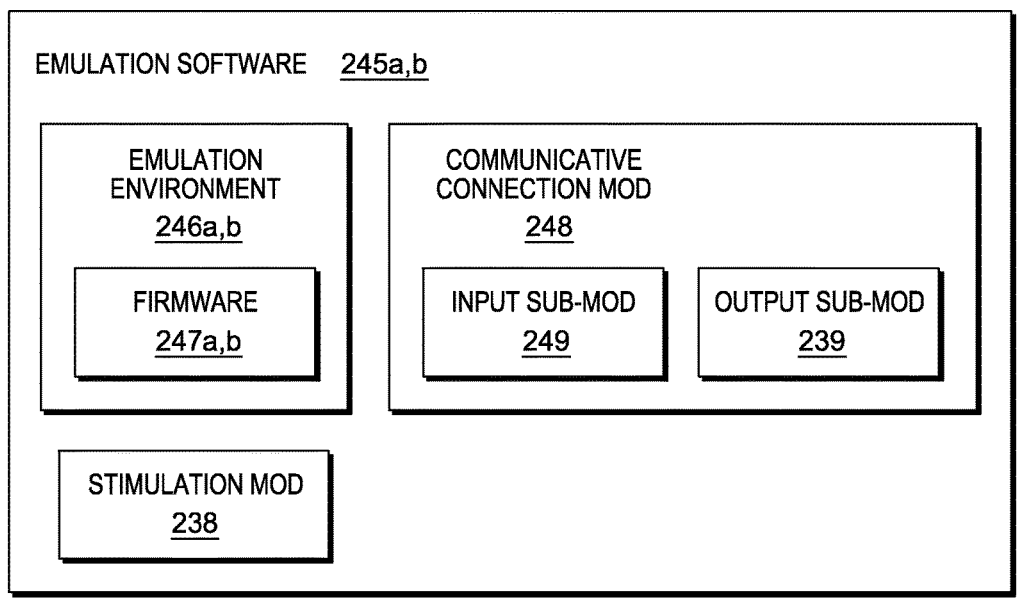
FIG. 3 is a schematic view of a machine logic (for example, software) portion of the first embodiment system.

FIG. 2 shows flowchart 250 depicting a set of operations according to the present invention. FIGS. 1 and 3 shows programs 241, 245 (that is, machine logic embodied in hardware or software or both) for controlling at least some of the set of operations of flowchart 250. This set of operations and associated machine logic will now be discussed, over the course of the following paragraphs, with extensive reference to FIG. 2 (for the operation blocks) and FIGS. 1 and 3 (for the machine logic blocks).

More specifically, with respect to the machine logic (for example, software) blocks shown in FIGS. 1 and 3 and used in the operations of flowchart 250 of FIG. 2: (i) operating system program 241 includes memory portion 241*a* and persistent storage portion 241*b*; (ii) tools A and B 242, 243 are a native part of operating system 241; (iii) tool A 242 includes memory portion 242*a* and persistent storage portion 242*b*; (iv) tool B 243 includes memory portion 243*a* and persistent storage portion 243*b*; (v) emulation software 245 includes memory portion 245*a* and persistent storage portion 245*b*; (vi) emulation software 245 creates an emulation environment 246 in which target firmware 247 runs; (vii) emulation software 245 includes memory portion 245*a* and persistent storage portion 245*b*; (viii) emulation environment 246 includes memory portion 246*a* and persistent storage portion 246*b*; and (ix) firmware 247 includes memory portion 247*a* and persistent storage portion 247*b*. To explain why the various machine logic blocks, discussed in this paragraph have memory portions and persistent storage portion, it is because software programs, as they run, include, create and or manage data that can shift between various forms of storage in a computer system based on factors such as immediate need for a particular piece of data. This is well understood in the art of computer programming generally, and will not be discussed in further discussed here.

Processing begins at operation S255, where operating system program 241 (see FIG. 1) is started up when computer 200 starts up. As is conventional, operating system 241 generally controls operations of computer 200. In order to help control the general operations of computer 200, operating system program 241 includes tool A and tool B, where each too performs a respective function. Example tools and their respective functions will be discussed in more detail in the following sub-section of this Detailed Description section.

Processing proceeds to operation S260, where emulation software 245 sets up emulation environment 246 and runs firmware 247 in the emulation environment. While the firmware is designed to be embedded in a physical device, in this example the firmware is not attached to any physical device because its code is being tested for bugs, possible improvements and the like. Because the running of firmware in an emulation environment is not new, the emulation environment will not be discussed in detail here, except with respect to the aspect of communications between the firmware-under-test and the operating system. Firmware 247*a,b*, as it begins to run in emulated environment 246*a,b* is shown in both FIGS. 1 and 3.

Processing proceeds to operation S265, where communicative connection module ("mod") 248 uses its machine logic to set up a communicative connection between firmware 247*a,b* and operating system 241*a,b*. More specifically, in this example, mod 248 of emulation software 245*a, b* communicatively connects firmware 247*a, b* to the operating system 241*a, b* in a manner so that communications sent from and received by the operating system are identical to communications that would be sent from and received by the operating system if the firmware were actually embedded in the target device instead of running in emulated environment 246*a, b*.

Even more specifically: (i) input sub-mod 249 controls communications received from the operating system to the firmware; and (ii) output sub-mod 239 controls communications flowing from the firmware to the operating system.

Processing proceeds to operation S270, where stimulation mod 238 causes operating system 241 to provide host input stimulation to firmware 247. This host input stimulation will be further discussed, below, in the following sub-section of this detailed description section.

Some embodiments of the present invention recognize the following facts, potential problems and/or potential areas for improvement with respect to the current state of the art: (i) methods of emulating a device have little to no interaction with the environment outside of the "sandbox" (closed environment); (ii) methods of emulating firmware that run on a device has little to no interaction with the environment outside of the "sandbox"; and/or (iii) it is difficult or impossible to provide items such as host input/output (I/O) stimulation to the emulated firmware.

Some embodiments of the present invention may include one, or more, of the following features, characteristics and/or advantages: (i) creates a framework which connects emulated flash SSD (solid-state drive) firmware directly to the host operating system; (ii) the host operating system "sees" the emulated flash SSD as a physically attached SSD; (iii) all the operating system tools can be used to stimulate the emulated flash SSD to test the firmware on the SSD; and/or (iv) all the operating system tools can be used to stimulate the emulated flash SSD to exercise the firmware on the SSD.

Some embodiments of the present invention may further include one, or more, of the following features, characteristics and/or advantages: (i) developers don't have to waste time writing stimulation scenarios; (ii) developers can use existing operating system tools; (iii) actual implementations of the flash SSD can be connected to the same host and comparisons made between the actual and emulated SSD; (iv) the same operating system tools that stimulate the emulated flash SSD work on the actual SSD; and/or (v) all tests written for the emulated flash SSD do not have to be rewritten for the actual SSD. Further with regard to item (iii) above, actual implementations of the flash SSD is valuable for defect diagnosis.

Some embodiments of the present invention may further include one, or more, of the following features, characteristics and/or advantages: (i) utilizes libfuse (library file system in user space) that enables a developer to implement a file system in user-space to implement "hooks" between the FUSE library and the emulator; (ii) no kernel-level software is modified; and/or (iii) surpasses other types of emulation methods which require low-level kernel/driver support.

Figure 4A:
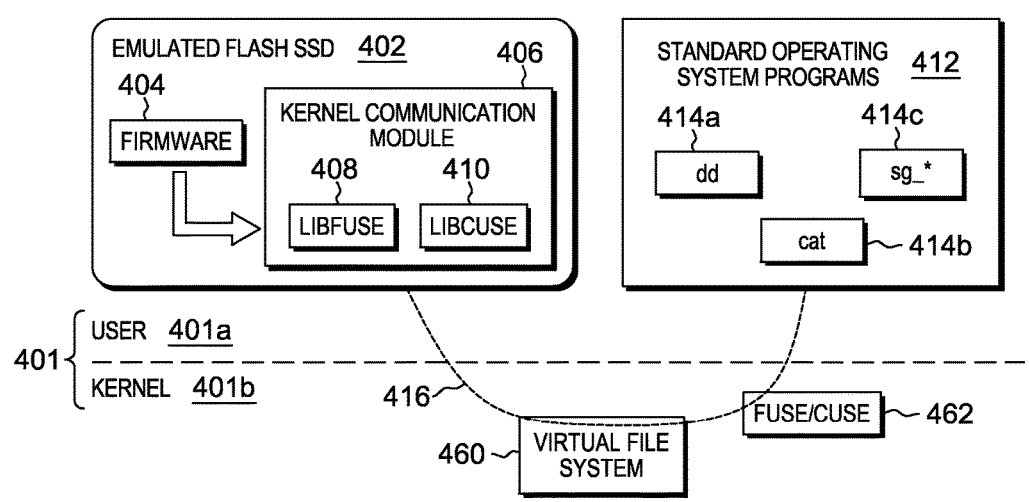
FIG. 4A is a schematic view of a second embodiment of a system according to the present invention.

As shown in FIG. 4A, system 400 includes: computational resources 401 (including user computational resources 401a and kernel computational resources 401b); emulated flash SSD (solid state drive) 402; flash SSD firmware 404; kernel communication module 406; libfuse (library for file system in user space) 408; libcuse (library for character devices in user space) 410; standard operating system programs set (also sometimes herein referred to as "host operating system") 412; standard operating system program dd 414a; standard operating system program cat 414b; standard operating system program sg3utils 414c; connection 416; virtual file system 460; and FUSE/CUSE (file system in user space and character devices in user space) 462.

The program dd 414a is a POSIX program whose primary purpose is to copy a file from one location to another. It has powerful features such as substituting "zero's" or "random" or in fact any POSIX file/pipe for the copy source, target, or both. In general when users of POSIX systems want to do a quick test to detect whether I/O can be performed on a device or file, the user uses program dd 414a. Program dd 414a can perform RAW I/O (input/output). In other words, program dd 414a can perform I/O on any type of device.

Program cat 414b displays the contents of a file. Program cat 414b is the POSIX standard way of displaying the contents of a file to the screen.

Program sg3_utils 414c is a set of utilities available in Linux which allows the user to issue any type of SCSI (small computer system interface) command to a Solid State or Hard Disk Drive. The inclusion of program sg3_utils in this embodiment shows versatility in the type of program to which some embodiments of the present invention may be applicable because program sg3_utils 414c can emulate both RAW devices as well as Block devices such as a Solid State Drive. This is not possible with conventional emulators that focus on one type of device only.

In system 400, when the emulated flash SSD 402 boots, connection 416 is created to the Linux operating system's libfuse 408 and libcuse 410. (Note: the term(s) "LINUX" may be subject to trademark rights in various jurisdictions throughout the world and are used here only in reference to the products or services properly denominated by the marks to the extent that such trademark rights may exist.) Libfuse 408 allows certain Linux utilities to pass through to the emulator. More specifically, the Linux utilities are utilities that expect to operate on a block device or file system. In this embodiment of the present invention, included as libfuse 408 commands are commands suitable for the following operating system programs: dd 414a; cat 414b; and/or sg3_utils 414c. Libcuse 410 allows certain Linux utilities, which utilities expect to operate on a character device. In this context, 'character device' should be understood as an example of a RAW device. "Character device" is what LINUX-compatible RAW devices are typically called in a POSIX environment. Use of a character device allows writing data to the device or read data from the device starting at any address and transferring any amount of data without restriction. The data written to or read from the device does not have to literally correspond to alphanumeric characters.

Examples of libcuse 410 commands are: (i) commands suitable for a SCSI (small computer system interface) generic toolset (such as, the sg3_utils package); and/or (ii) commands for any tool which intends to send IOCTLs (input/output controls) to the flash SSD. Any appropriate commands sent to the libfuse 408 or libcuse 410, through connection 416, are forwarded to the emulated firmware 404 for processing. Any commands sent by the emulated firmware 404 are forwarded through the libfuse 408 or libcuse 410, again through connection 416, back to the operating system.

While this example uses a Linux operating system, and Linux operating system tools, the present invention extends to any operating system running on a kernel and having a FUSE and/or CUSE (or equivalent). These other operating systems include, at least some other POSIX type operating systems besides Linux. In non-POSIX based operating systems (such as Microsoft Windows), existing libraries providing a user space file system implementation (such as the Dokan library) can be used or written to provide the hooks necessary to connect the emulator to the operating system. (Note: the term(s) "MICROSOFT," "WINDOWS," "LINUX," "POSIX," and/or "DOKAN" may be subject to trademark rights in various jurisdictions throughout the world and are used here only in reference to the products or services properly denominated by the marks to the extent that such trademark rights may exist.)

Commands passed along connection 416 from emulated flash SSD 402 to the standard operating systems program 412 go through the Linux kernel computational resources 401b and interface with kernel virtual file system 460 and kernel FUSE/CUSE 462. As shown by the curve of communication path 416 in FIG. 4A, commands between the standard operating system programs set (which is in the user space above the dotted line in FIG. 4A) and the emulated flash SSD (which is also in the user space above the dotted line in FIG. 4A) are passed through the kernel space below the dotted line in FIG. 4A.

Screenshot 452 of FIG. 4B shows emulated SSD firmware used in system 400. Screenshot 454 of FIG. 4C shows code associated with a first operating system tool used in system 400. Screenshot 456 of FIG. 4D shows code associated with a second operating system tool used in system 400. On a terminology note, "operating system program" and "operating system tool" are to be considered to have the same meaning in this document. Screenshot 458 of FIG. 4E shows code associated with a third operating system tool used in system 400.

Figure 5:
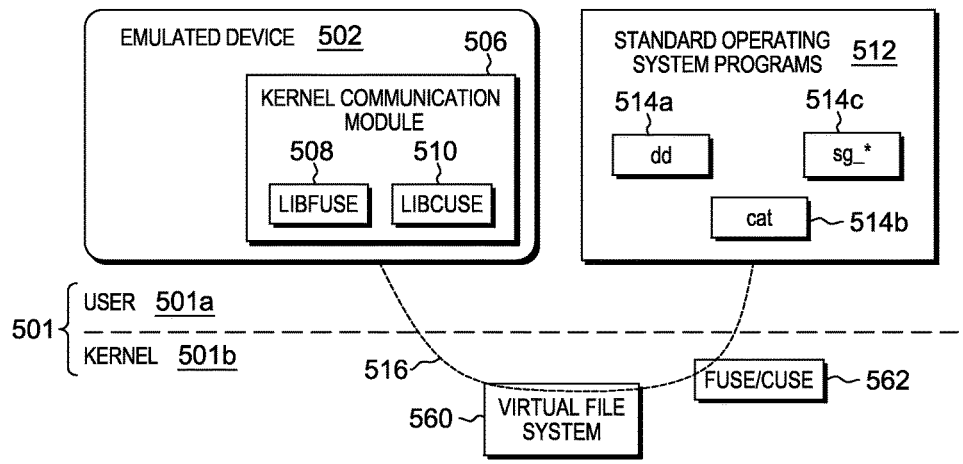
FIG. 5 is a schematic view of a third embodiment of a system according to the present invention.

As shown in FIG. 5, system 500 includes: computational resources 501 (including user computational resources 501a and kernel computational resources 501b); emulated device 502; kernel communication module 506, libfuse 508; libcuse 510; host operating system 512; standard operating system programs 514a to 514c; connection 516; virtual file system 560; and FUSE/CUSE 562.

In system 500, system 400 (described above) has been extended to model other sub-systems. More specifically, instead of emulating a flash SSD (as in system 400), other devices can be emulated in emulated device block 502. These devices include, but are not limited to: (i) a PCI (peripheral component interconnect) ethernet adapter; and/or; (ii) a RAID (redundant array of independent disks)

controller card. These devices are represented in system 500 as emulated device 502 and will be described below.

Some embodiments of the present invention may further include one, or more, of the following features, characteristics and/or advantages: (i) can be expanded to emulate multiple components of a system; (ii) can be expanded to emulate an entire system consisting of various different components simultaneously, such as multiple emulated flash SSDs; (iii) can connect multiple emulated components, such as emulated flash SSDs via an operating system standard API (application programming interface), such as a Unix socket; and/or (iv) can emulate a PCI RAID controller adapter and then connect emulated flash SSDs, such as emulated flash SSDs.

Figure 6:
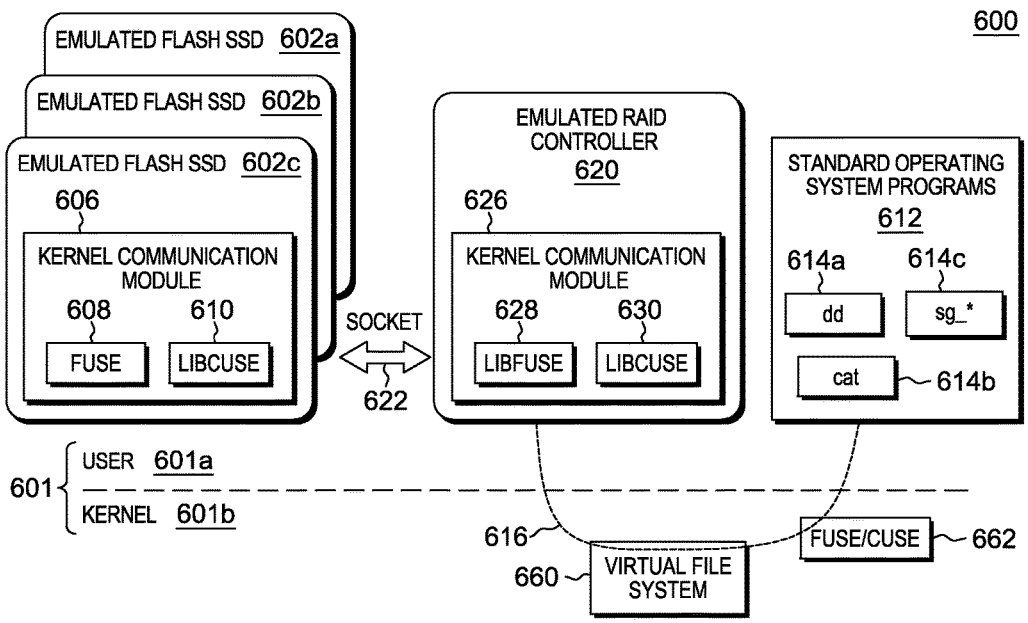
FIG. 6 is a schematic view of a fourth embodiment of a system according to the present invention.

As shown in FIG. 6, diagram 600 includes: computational resources 601 (including user computational resources 601a and kernel computational resources 601b); emulated flash SSDs 602a to 602c; kernel communication module 606; libfuse 608; libcuse 610; host operating system 612; standard operating system programs 614a to 614c; connection 616; socket 622; emulated RAID (redundant array of independent disks) controller 620; kernel communication module 626; libfuse 628; libcuse 630; virtual file system 660; and FUSE/CUSE 662.

In system 600, the concepts described above in connection with system 400 and system 500 above are further expanded to emulate: (i) multiple components of a system; and/or (ii) an entire system consisting of various different components simultaneously. More specifically, in system 600, multiple emulated flash SSDs 602a to 602c include libfuse 608 and libcuse 610 within kernel communications module 606. Likewise, libfuse 628 and libcuse 630 are included within kernel communications module 626 and are included as part of emulated RAID controller 620. Emulated flash SSDs 602a to 602c are connected to and communicate with emulated RAID controller 620 using socket 622.

Emulated flash SSDs 602a to 602c are connected and communicate with emulated RAID controller 620 using socket 622. When emulated flash SSDs 602a to 602c and/or emulated RAID controller 620 boots, connection 616 is created to the Linux operating system 612. This connection uses libfuse 608 and libcuse 610 included in kernel communication module 606 and/or libfuse 628 and libcuse 630 included in kernel communication module 626. The libfuse connections allow certain Linux utilities to pass through to the emulator. Again, examples of libfuse commands are commands suitable for the following operating system programs such as dd 614a; cat 614b; and/or sg3_utils 614c. Commands sent to the libfuse 608/628 or libcuse 610/630 are forwarded to emulated flash SSDs 602a to 602c and/or emulated RAID controller 620 for processing. Any commands sent by emulated flash SSDs 602a to 602c and/or emulated RAID controller 620 are forwarded through the libfuse 608/628 or libcuse 610/630 using connection 616 back to the standard operating system program 612. Commands being passed by connection 616 from emulated flash SSDs 602a to 602c and/or emulated RAID controller 620 to the standard operating systems program 612 go through the Linux kernel 601b and interface with kernel virtual file system 660 and kernel FUSE/CUSE 662. These commands are passed from the user 601a, through the Linux kernel 601b, and then back to user 601a using connection 616.

Some embodiments of the present invention may further include one, or more, of the following features, characteristics and/or advantages: (i) emulated devices do not have to be running on the same server; (ii) emulated devices do not have to be running on the same operating system; and/or (iii) one server, such as host server, may be running an emulated RAID controller, connected via Unix sockets, to other multiple servers running emulated flash SSDs.

Figure 7:
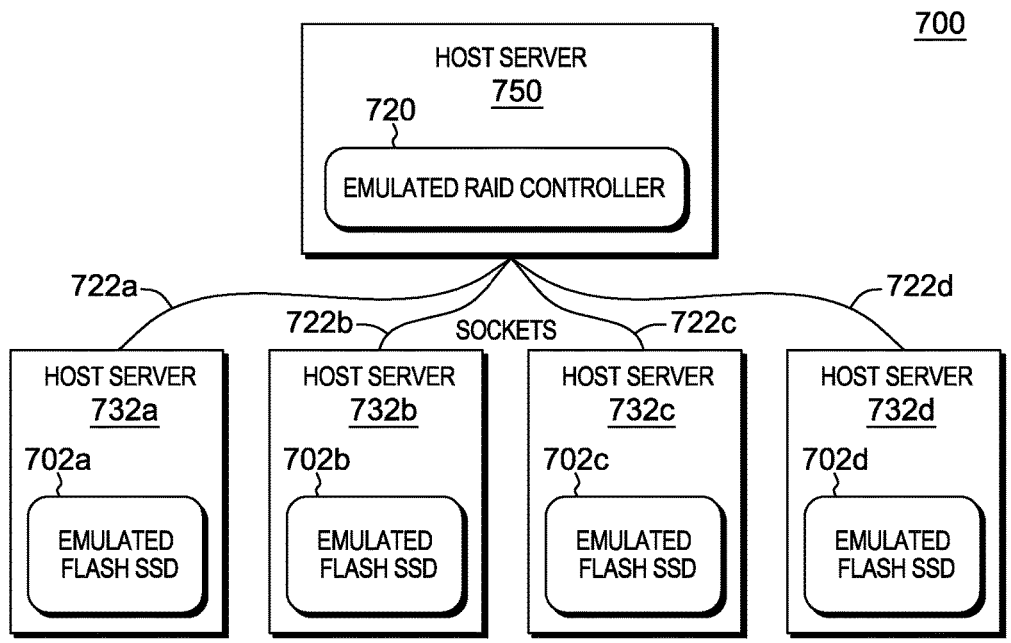
FIG. 7 is another schematic view of the fourth embodiment system.

As shown in FIG. 7, system 700 includes: emulated flash SSDs 702a to 702d; emulated RAID controller 720; sockets 722a to 722d; host servers 732a to 732d; and host server 750. In system 700, host server 750 is shown running emulated RAID controller 720. Host server 750 is connected to and communicates with "other" multiple host servers. More specifically, Unix sockets 722a to 722d provide the connection/communication path from host server 750 to host servers 732a to 732d respectively. Host servers 732a to 732d are each running emulated flash SSDs 702a to 702d respectively. System 700 shows that one or more emulated device(s) can run on their own server, which in turn, can be connected and communicate with other host servers.

Some embodiments of the present invention may further include one, or more, of the following features, characteristics and/or advantages: (i) ability to record I/O traces; (ii) ability to playback I/O traces; (iii) recording of traces is user controlled; (iv) playback of traces is user controlled; (v) ability to take an I/O trace from an actual device and play it back into the emulated device, or vice-versa; and/or (vi) aids in debugging. Further with regard to item (vi) above, a user can replay a particular I/O sequence over and over to recreate a particular problem.

Figure 8:
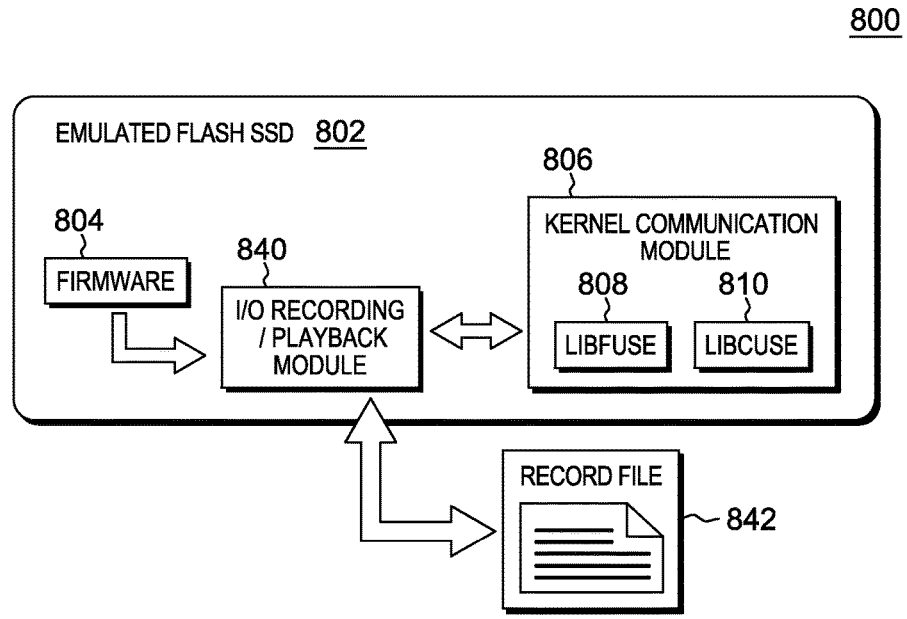
FIG. 8 is a schematic view of a fifth embodiment of a system according to the present invention.

As shown in FIG. 8, system 800 includes: emulated flash SSD 802; flash SSD firmware 804; kernel communication module 806; libfuse 808; libcuse 810; I/O recording/playback module 840; and record file 842.

In system 800, emulated flash SSD 802 includes firmware 804. Firmware 804 communicates with and commands I/O recording/playback module 840. Likewise, I/O recording/playback module 840 communicates with libfuse 808 and libcuse 810 included within kernel communication module 806. The operation of I/O recording/playback module 840 is user controlled, and is used to record and/or retrieve I/O traces from record file 842. The I/O data stored on record file 842 may be used by engineers and/or programmers to debug and/or recreate problems.

Figure 9:
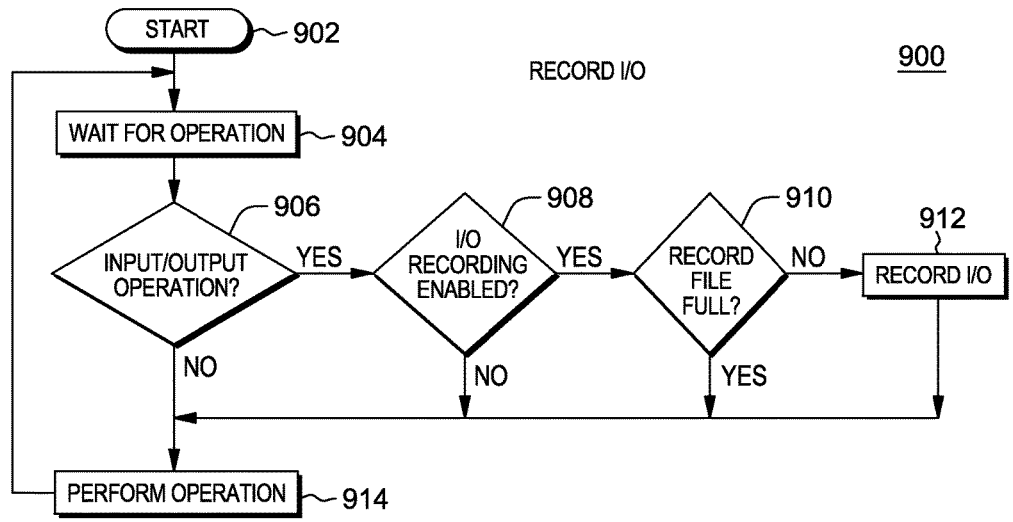
FIG. 9 is a flowchart of a second embodiment of a method according to the present invention.

As shown in FIG. 9, flowchart 900 depicts a method according to the present invention.

Processing begins at operation 902 where recording of the I/O data begins.

Processing continues to operation 904 where the software waits (monitors) for a record I/O operation to act on.

At operation 904 above, once the software has a record I/O operation to act on, processing continues to operation 906 where the software determines if an I/O operation has occurred.

At operation 906 above, if the software determines that an I/O operation has occurred (Yes), processing continues to operation 908 where the software determines if the I/O recording is enabled.

At operation 908 above, if the software determines if the I/O recording is enabled (Yes), processing continues to operation 910 where the software determines if the record file is full.

At operation 910 above, if the software determines the record file in not full (No), processing continues to operation 912 where recording of the I/O data is performed.

At operation 906 above, if the software has determined the I/O operation has not occurred (No), processing continues to operation 914.

At operation 908 above, if the software determines the I/O recording in not enabled (No), processing continues to operation 914.

At operation 910 above, if the software determines the record file is full (Yes), processing continues to operation 914.

At operation 914, the software performs all operations pertaining to recording of the I/O data.

Processing loops back to operation 904 where the software again waits (monitors) for a record I/O operation to act on.

Some embodiments of the present invention may further include one, or more, of the following features, characteristics and/or advantages: (i) all operations identified as "I/O" operations (such as read or write) are saved to a file if recording is "enabled"; and/or (ii) the I/O operations are saved until the record file is "full". Further with regard to item (ii) above, "full" is defined as being the "maximum file size" or the "number of I/O operations" to record, and is defined by the user.

Figure 10:
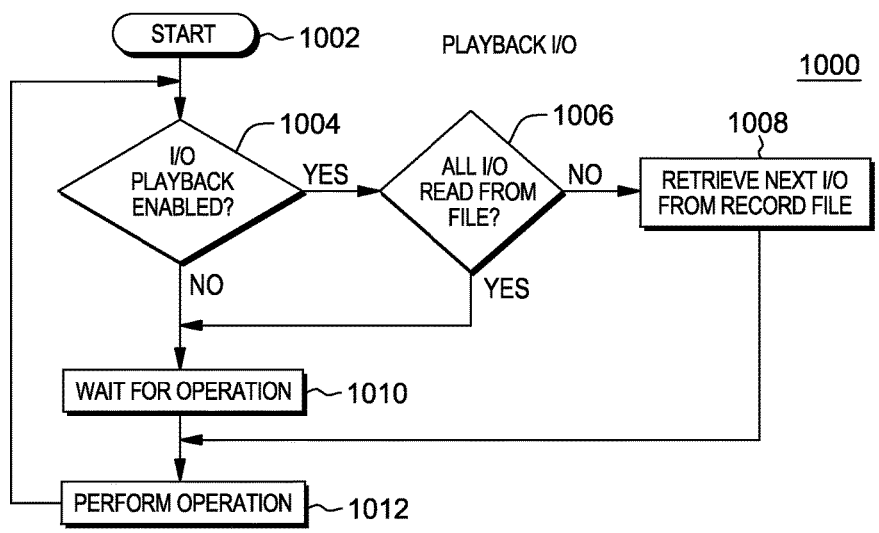
FIG. 10 is a flowchart of a third embodiment of a method according to the present invention.

As shown in FIG. 10, flowchart 1000 depicts a method according to the present invention. Processing begins at operation 1002 where playback of the I/O data file begins.

Processing continues to operation 1004 where the software determines if I/O playback is enabled.

At operation 1004 above, if the software determines the I/O playback is enabled (Yes), processing continues to operation 1006 where the software determines if all I/O data has been read from the file.

At operation 1006 above, if the software determines that not all the I/O data has been read from the file (No), processing continues to operation 1008 where the software retrieves the next I/O data record from the file.

At operation 1004 above, if the software determines the I/O playback is not enabled (No), processing continues to operation 1010.

At operation 1006 above, if the software determines that all of the I/O data has been read from the file (Yes), processing proceeds to operation 1010.

At operation 1010, the software waits (monitors) for a playback I/O operation to act on.

Processing continues to operation 1012 where the software performs all operations pertaining to playback of the I/O data.

Processing loops back to operation 1004 where the software again determines if the playback I/O is enabled.

Some embodiments of the present invention may further include one, or more, of the following features, characteristics and/or advantages: (i) if a valid trace file is fed to the emulator and playback is "enabled", all I/O contained within the trace file are played back through the emulator; and/or (ii) once all I/O traces are read from the file, playback ceases and the emulator continues to operate in normal mode, handling I/O in a usual manner.

Some embodiments of the present invention may further include one, or more, of the following features, characteristics and/or advantages: (i) ability to save a snapshot of the state of the firmware; (ii) ability to load a snapshot of the state of the firmware; and/or (iii) ability for loading firmware images, in a certain state, into the emulator.

Figure 11:
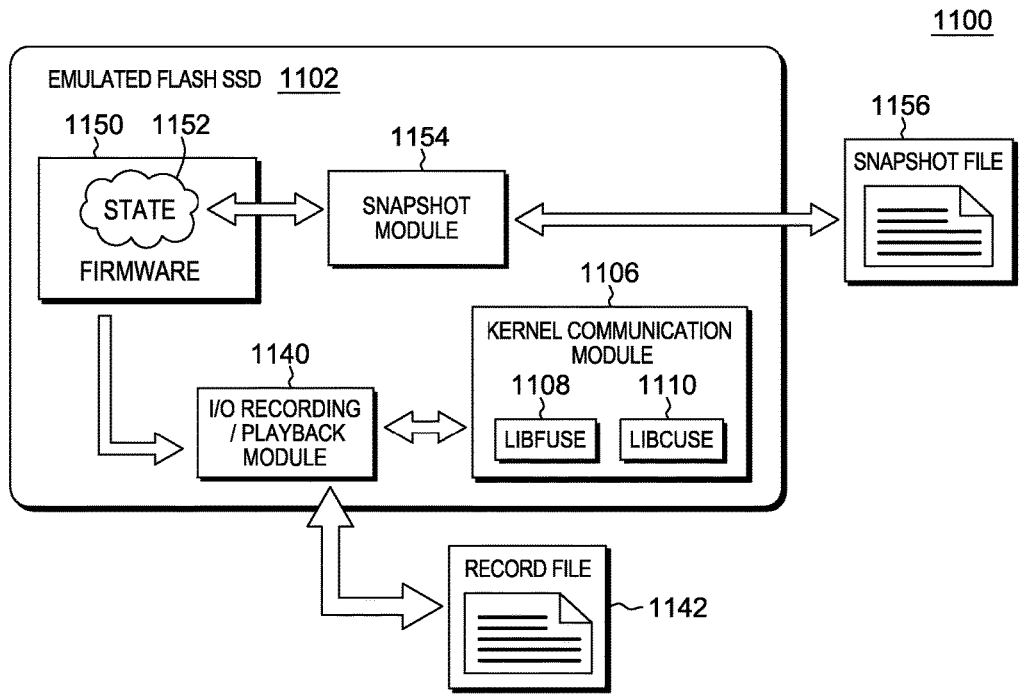
FIG. 11 is a schematic view of a sixth embodiment of a system according to the present invention.

As shown in FIG. 11, system 1100 includes: emulated flash SSD 1102; kernel communication module 1106; libfuse 1108; libcuse 1110; I/O recording/playback module 1140; record file 1142; firmware 1150; firmware state 1152; snapshot module 1154; and snapshot file 1156.

In system 1100, the concept described in FIG. 7, system 700 above is taken to the next level where the ability to save and load a "snapshot" of the firmware state included in the firmware is shown. Emulated flash SSD 1102 includes firmware 1150. Firmware 1150 includes firmware state 1152.

Firmware 1150 communicates with and commands I/O recording/playback module 1140. Likewise, I/O recording/playback module 1140 communicates with libfuse 1108 and libcuse 1110 included in kernel communication module 1106. The operation of I/O recording/playback module 1140 is user controlled, and is used to record and/or retrieve I/O traces from record file 1142. Firmware 1150 and firmware state 1152 also communicate with snapshot module 1154. Snapshot module 1154 in turn communicates with snapshot file 1156. Firmware state 1152 is passed through snapshot module 1154 and is stored in snapshot file 1156. Snapshot file 1156 has the ability to save and load the firmware state 1152 into the emulator.

Figure 12:
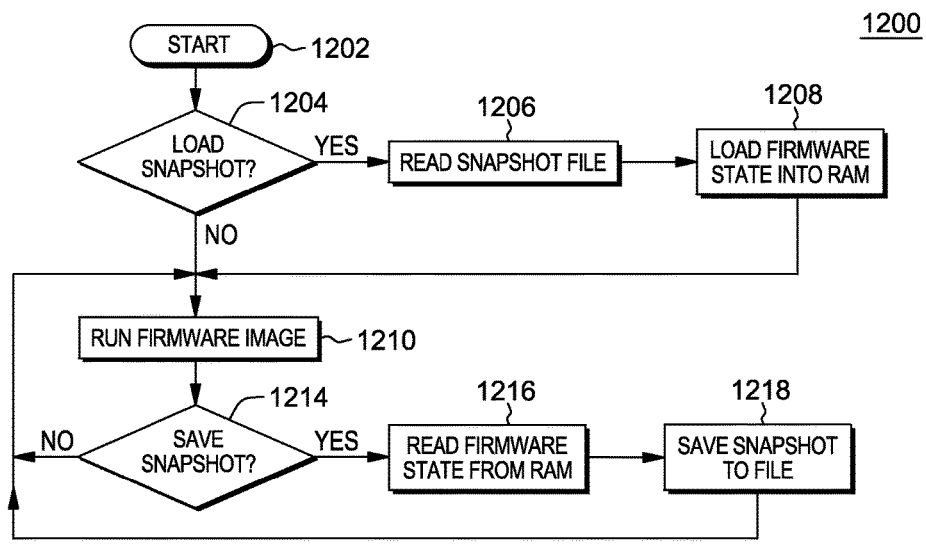
FIG. 12 is a flowchart of a fourth embodiment of a method according to the present invention.

As shown in FIG. 12, flowchart 1200 depicts a method according to the present invention. Processing begins at operation 1202 where loading a snapshot of the firmware state begins.

Processing continues to operation 1204 where the software determines if a snapshot of the firmware state should be loaded.

At operation 1204 above, if the software determines a snapshot of the firmware state is to be loaded (Yes), processing continues to operation 1206 where the software reads the snapshot file.

Processing continues to operation 1208 where the software loads the firmware state into RAM (random access memory).

At operation 1204 above, if the software determines a snapshot of the firmware should not be loaded (No), processing continues to operation 1210.

At operation 1210, the software runs the firmware image.

Processing continues to operation 1214 where the software determines if the snapshot of the firmware image should be saved. If (Yes), processing continues to operation 1216 where the software reads the firmware state from RAM.

Processing continues to operation 1218 where the software saves the snapshot to file.

Processing loops back to operation 1210 where the software again determines whether or not to run the firmware image.

At operation 1214 above, if the software determines the snapshot of the firmware image should not be saved (No), processing loops back to operation 1210 where the software again determines whether or not to run the firmware image.

In some embodiments of the present invention, firmware is emulated by: (i) conventional smart buffers; and/or (ii) some other means.

Some embodiments of the present invention may further include one, or more, of the following features, characteristics and/or advantages after the firmware is emulated: (i) the emulated firmware is connected in data communication (or, "communatively connected") directly to the operating system; (ii) the operating system "sees" the emulated firmware as a physical disk drive; (iii) the user can use common operating system tools (for example, partition utilities, I/O generators, etc.) instead of writing their own exercising tools from scratch; (iv) multiple heterogeneous components can be emulated (for example, a RAID controller card, and not just a SSD); (v) multiple heterogeneous components, once emulated, can be connected to one another; (vi) emulated components can exist anywhere on any server and can exist on heterogeneous servers. Further with regard to item (i) in the foregoing list, a "shim" is a very small piece of software which acts as a conduit between two other layers of software allowing those two pieces of software to seamlessly communicate, even if they natively could not do so; shim here refers to the fact that the two layers of software don't realize the other side is speaking a different protocol or language. Further with regard to item (v) above, a RAID controller card can be emulated and be connected to several instances of emulated flash SSDs. The emulated RAID controller card then "sees" the SSDs as actual physical SSDs. Further with regard to item (vi) above, the RAID Controller card emulator can run on a Windows machine in a lab environment and connect to multiple flash SSD emulator instances running on a Linux laptop.

Some embodiments of the present invention may further include one, or more, of the following features, characteristics and/or advantages after the firmware is emulated: (i) recording of I/O traces is supported; (ii) playback of I/O traces is supported; (iii) state of the firmware (or the contents of the conventional smart buffers) can be saved into a snapshot file; and/or (iv) state of the firmware (or the contents of the conventional smart buffers) can be re-loaded into new instances.

Further, with regard to items (i) and (ii) in the preceding paragraph, in an extemporary use case, and given an I/O trace from an actual flash SSD, the user can feed the trace into the emulated SSD to recreate a problem scenario. Further, with regard to items (iii) and (iv) in the preceding paragraph, in an extemporary use case, if a defect is encountered the user can snapshot the state and save it. To debug the problem, the state can be re-loaded as many times as necessary, instead of running I/O, to attempt to get it back into the defect state.

Some embodiments of the present invention may further include one, or more, of the following features, characteristics and/or advantages: (i) a way to run the firmware of an HDD (hard disk drive) or SSD (solid state drive) inside of an emulator; (ii) running the firmware of a SSD in an emulated environment such that it appears as a physical SSD to the personal computer's operating system; (iii) does not relate to emulating anything composing the personal computer's operating system; (iv) does not relate to anything dealing with reboots of the personal computer; (v) to further connect the emulated environment of the firmware of a SSD into an operating system in such a way that the operating system "thinks" that the emulated device is a physical device, allowing the developer to exercise the firmware of the physical device using the native operating system tools (also herein referred to as operating system programs); and/or (vi) the developer does not have to write any special APIs (application programming interfaces) or code in order to interact with the emulated device.

Some embodiments of the present invention may further include one, or more, of the following features, characteristics and/or advantages: (i) does not describe any features to utilize any physical devices; (ii) does not cause any physical devices to look like a different type of physical device; (iii) does not require a kernel module; (iv) features occur in a user environment; (v) has an exemplary implementation in the Linux operating system; (vi) is not confined to a single operating system; and/or (vii) ability to run the exact firmware image that exists on the SSD in the emulated environment, in this way, the software developer is testing the firmware image of the SSD.

DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    running, on a first processor(s) set, an operating system including native operating system tools, with the native operating system tools being tools which are shipped with the operating system;
    emulating, on a second processor(s) set and by peripheral device emulation software, a physical peripheral device, with the emulation of the physical peripheral device being performed so that a device-driver software of the peripheral device emulation software is unmodified;
    running, on the second processor(s) set and in an emulated environment, peripheral firmware designed for the physical peripheral device; and
    during the running of the peripheral firmware, testing, by the native operating system tools, the peripheral firmware such that: (i) from an operating system perspective the peripheral firmware appears as if the peripheral firmware were running in the physical device rather than running in the emulated environment, and (ii) the device-driver software of the peripheral firmware is unmodified.

2. The method of claim 1 wherein the first processor(s) set and the second processor(s) set are the same processor set such that the operating system, the emulated environment and the firmware are running on a single computer.

3. The method of claim 1 wherein the first processor(s) set and the second processor(s) set are different processor sets, respectively located in two different computers in data communication with each other.

4. The method of claim 3 wherein:
    the peripheral device emulation software includes a RAID (redundant array of independent disks) controller; and
    the communicative connection of the firmware to the operating system is controlled, at least in part, by the RAID controller.

5. The method of claim 1 further comprising:
using, by the peripheral firmware running in the emulated environment, a first operating program, which is part of the operating system, to perform a first function.

6. The method of claim 5 wherein the first function includes at least one of the following: (i) copying a file from one location to another; (ii) display the contents of a file; and/or (iii) issue any type of SCSI (small computer system interface) command to a solid state drive or disk drive.

7. The method of claim 1 wherein the target device is a non-volatile data storage device.

8. The method of claim 7 wherein the target device is a solid state drive (SSD).

9. The method of claim 8 wherein the target device is a flash SSD.

10. The method of claim 1 further comprising:
providing host input/output stimulation between the peripheral firmware and the operating system over the communicative connection between the peripheral firmware and the operating system.

11. A computer program product for running firmware in an emulated environment, the computer program product comprising a computer readable storage medium having program instructions embodied therewith, wherein the computer readable storage medium is not a transitory signal per se, the program instructions executable by a first processor(s) set located in a first computer system to cause the first computer system to perform a method comprising:
running, on the first processor(s) set, an operating system including native operating system tools, with the native operating system tools being tools which are shipped with the operating system;
emulating, on a second processor(s) set and by peripheral device emulation software, a physical peripheral device, with the emulation of the physical peripheral device being performed so that a device-driver software of the peripheral device emulation software is unmodified;
running, on the second processor(s) set and in an emulated environment, peripheral firmware designed for the physical peripheral device; and
during the running of the peripheral firmware, testing, by the native operating system tools, the peripheral firmware such that: (i) from an operating system perspective the peripheral firmware appears as if the peripheral firmware were running in the physical device rather than running in the emulated environment, and (ii) device-driver software of the peripheral firmware is unmodified.

12. The product of claim 11 wherein the program instructions include a RAID controller.

13. The product of claim 11 wherein the first processor(s) set is the same as the second processor(s) set.

14. The product of claim 11 wherein:
the second processor(s) set is different from the first processor(s) set; and
communications sent from and received by the operating system are communicated through a communication network which is part of the first computer system.

15. The product of claim 11 wherein the communications sent from and received by the first operating system allow the peripheral firmware to use a first operating program, which is part of the operating system, to perform a first function.

16. The product of claim 15 wherein the first function includes at least one of the following: (i) copying a file from one location to another; (ii) display the contents of a file; and/or (iii) issue any type of SCSI (small computer system interface) command to a solid state drive or disk drive.

17. A computer system comprising:
a processor(s) set; and
a computer readable storage medium including program instructions stored on the computer readable storage medium;
wherein:
the processor(s) set is configured to execute the program instructions stored on the computer readable storage medium;
the program instructions include program instructions for causing the processor(s) set to perform operations including the following:
running, on a first processor(s) set, an operating system including native operating system tools, with the native operating system tools being tools which are shipped with the operating system,
emulating, on a second processor(s) set and by peripheral device emulation software, a physical peripheral device, with the emulation of the physical peripheral device being performed so that a device-driver software of the peripheral device emulation software is unmodified,
running, on a second processor(s) set and in an emulated environment, peripheral firmware designed for the physical peripheral device, and
during the running of the peripheral firmware, testing, by the native operating system tools, the peripheral firmware such that: (i) from an operating system perspective the peripheral firmware appears as if the peripheral firmware were running in the physical device rather than running in the emulated environment, and (ii) device-driver software of the peripheral firmware is unmodified; and
the target device emulation instructions include instructions executable by the processor, when the firmware is running in the emulated environment, to communicatively connect the firmware to an operating system in a manner so that communications sent from and received by the operating system are identical to communications that would be sent from and received by the operating system if the firmware were actually embedded in the target device instead of running in the emulated environment.

18. The system of claim 17 wherein the instructions to communicatively connect the peripheral firmware to the operating system include a RAID controller.

19. The system of claim 18 wherein:
the processor(s) set includes a first processor(s) sub-set located in a first computer, and a second processor(s) set located in a second computer;
the first and second computers communicate over a communication network;
the operating system is located, at least substantially, in the first computer; and
the RAID controller is located, at least substantially, in the second computer.

20. The system of claim 17 wherein the physical peripheral device emulation instructions further include instructions executable by the processor to provide host input/output stimulation between the peripheral firmware and the operating system over the communicative connection between the peripheral firmware and the operating system.

* * * * *